United States Patent [19]

Kobayashi et al.

[11] Patent Number: 4,947,252
[45] Date of Patent: Aug. 7, 1990

[54] GHOST CANCELING APPARATUS

[75] Inventors: Michio Kobayashi; Reiichi Kobayashi; Tatsuya Shiki, all of Osaka, Japan

[73] Assignee: NEC Home Electronics Ltd., Osaka, Japan

[21] Appl. No.: 327,055

[22] Filed: Mar. 22, 1989

[30] Foreign Application Priority Data

Mar. 22, 1988 [JP] Japan .................................. 63-67560
Jun. 29, 1988 [JP] Japan .................................. 63-161264

[51] Int. Cl.$^5$ ........................ H04N 5/213; H04N 9/64
[52] U.S. Cl. .................................... 358/167; 358/36; 358/905
[58] Field of Search ................. 358/36, 37, 166, 167, 358/905

[56] References Cited

U.S. PATENT DOCUMENTS

| | | | |
|---|---|---|---|
| 3,956,585 | 5/1976 | Butler et al. | 358/905 |
| 4,476,491 | 10/1984 | Murata et al. | 358/905 |
| 4,502,077 | 2/1985 | Morotomi et al. | 358/167 |
| 4,575,857 | 3/1986 | Murakami | 358/905 |
| 4,625,241 | 11/1986 | Ohzeki | 358/905 |

FOREIGN PATENT DOCUMENTS

| | | |
|---|---|---|
| 58-3380 | 1/1983 | Japan . |
| 58-3381 | 1/1983 | Japan . |
| 58-27475 | 2/1983 | Japan . |
| 58-30285 | 2/1983 | Japan . |
| 58-31680 | 2/1983 | Japan . |
| 58-75980 | 5/1983 | Japan . |
| 58-175376 | 10/1983 | Japan . |
| 58-195375 | 11/1983 | Japan . |
| 58-201476 | 11/1983 | Japan . |
| 58-89076 | 5/1984 | Japan . |
| 59-183073 | 12/1984 | Japan . |
| 59-72491 | 4/1985 | Japan . |
| 61-25376 | 2/1986 | Japan . |
| 61-152169 | 7/1986 | Japan . |
| 62-173 | 1/1987 | Japan . |
| 62-159984 | 7/1987 | Japan . |
| 62-181579 | 8/1987 | Japan . |
| 63-74271 | 4/1988 | Japan . |
| 63-142778 | 6/1988 | Japan . |
| 63-189055 | 8/1988 | Japan . |

Primary Examiner—John K. Peng
Attorney, Agent, or Firm—Cushman, Darby & Cushman

[57] ABSTRACT

A ghost canceling apparatus provided with a reference waveform Fourier coefficient holding unit in which a normal ghost detection unit holds a Fourier coefficient produced by Fourier transforming a reference waveform; a nearby region Fourier transform unit for Fourier-transforming a nearby region of a reference waveform extracted from the received television signal and a normal Fourier transform unit for Fourier transforming a normal region of the reference waveform extracted from the received television signal; a calculation unit for dividing the output from the normal region Fourier transform unit by the output from the nearby region Fourier transform unit and then for multiplying a Fourier coefficient of the reference waveform Fourier coefficient holding unit; a reverse Fourier transform unit for reverse Fourier transforming the output of the calculation unit; a tap gain supplying unit for supplying the dummy normal ghost producing unit with the output of the reverse Fourier transform unit as a tap gain of the transversal filter.

10 Claims, 13 Drawing Sheets

GHOST CANCELING APPARATUS

BACKGROUND OF THE INVENTION

The present invention relates to a ghost canceling circuit which is installed in a television receiver.

Generally, a television receiver receives through an antenna a television signal composed of a directly received signal and delay signals which reach the antenna through several reflecting routes in which the signals are reflected by neighboring geographical features, neighboring buildings, moving vehicles or the like. Due to such delay signals, generally, multiple images may be come out to some extent on the received picture. Such delay signals causing the multiple images are called "a ghost" and a phenomenon that large multiple images deteriorate the quality of the picture is called "a ghost obstacle".

A ghost canceling apparatus, used for canceling such ghosts, is provided with a dummy-ghost producing unit consisting of a transversal filter and a ghost detecting unit. The ghost detection unit detects the condition of the occurrence of the ghost that varies with time on the basis of a reference waveform which has been inserted at a predetermined position of the received television signal, and automatically controls a tap gain which is to be supplied to the transversal filter. Further, this ghost canceling apparatus is provided with an adder unit for composing (i.e., adding) the television signal originally received and a dummy ghost produced from this television signal.

The dummy-ghost producing unit arranged by the transversal filter produces the dummy ghost by using a group of cascaded delaying units, a group of coefficients and an adder, which dummy ghost simulates a mechanism of ghost occurrence such as delay of the signal, damping, and inter-summing that are caused by multiple reflection. This dummy ghost is generally produced in opposite polarity and is added through the adder unit to the television signal originally received, thereby canceling out with the ghost components contained in the television signal.

The afore-mentioned ghost may be divided into two main groups for convenience, a nearby ghost that appears substantially at the same time as the original signal (includes a case in which the ghost may be somewhat prior to the television signal) and a normal ghost that appears about several micro seconds after the signal originally received.

Figure 1:
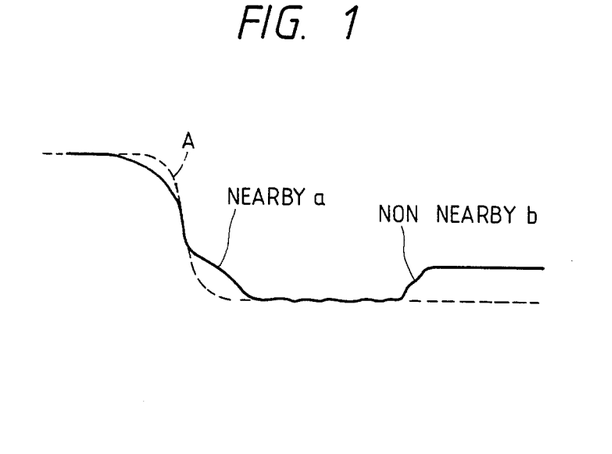
FIG. 1 is a waveform diagram for illustrating the concept of a normal ghost and a nearby ghost.

In other words, as shown in FIG. 1, assuming that a waveform A shown in a dotted line represents the signal originally received when no ghost exists, the nearby ghost causes a distorted waveform a as shown in a solid line and non-nearby ghost produces a distorted waveform b. The non-nearby ghost appears in the time axis away from the signal originally received and tends to repeatedly appear due to multiple reflection in the order of a parent ghost, a child ghost, and then a grandchild ghost with a certain time space therebetween, gradually being damped. Thus to eliminate the non-nearby ghost it is desirable to apply a cyclic composition to both the television signal originally received and the dummy ghost produced from the television signal originally received. In the mean time, the nearby ghost overlaps the original television signal on the time axis, thus the produced nearby dummy-ghost may have a portion ahead of the original signal on the time axis, therefore the cyclic type composition cannot be applied to the produced ghost and the original signal.

Additionally, with the nearby ghost, the waveform distortion due to the ghost and the waveform distortion due to transmission characteristics occur in such a way that they are integral and inseparable; therefore cancellation of the nearby ghost can be thought of as a kind of waveform equalizing.

Figure 2:
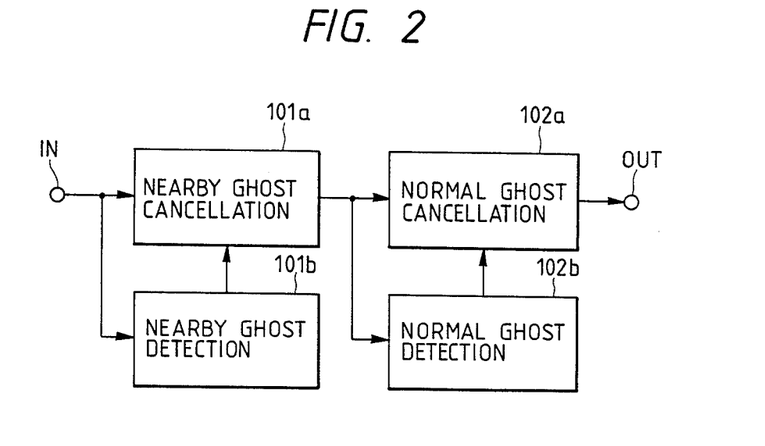
FIG. 2 is a block diagram for showing an arrangement of a prior art ghost canceling apparatus.

Thus, one method that has been proposed is a method in which cancellation of the nearby ghost and the non-nearby ghost is performed in two steps, i.e., the nearby ghost is first canceled by cascading exclusive canceling apparatuses but not a single apparatus and then the non-nearby ghost. The entire ghost canceling apparatus is arranged, as shown in FIG. 2, by a nearby ghost processing unit connected in cascade with a normal ghost processing unit, the former consisting of a nearby ghost cancellation unit 101a and a nearby ghost detection unit 101b and the latter consisting of a normal ghost cancellation unit 102a and a normal ghost detection unit 102b.

While the nearby ghost is a special phenomenon that cannot be clearly distinguished from various transmission factors that may cause the waveform distortion, the non-nearby ghost is originated from a phenomenon of detoured propagation path formation specific to the ghost. Therefore, the non-nearby ghost is often referred to as a normal ghost. This non-nearby ghost is referred to as the normal ghost in the following description.

Such a ghost canceling apparatus requires multiple averaging processes, several tens to several hundred times, of the reference waveform extracted from respective frames in the received television signal, and therefore suffers from a problem that ghost detection takes time. With a ghost canceling apparatus shown in FIG. 2, the detection and cancellation of the normal ghost is initiated after the detection and cancellation of the nearby ghost has been completed thus the entire processing takes time, thereby being unable to follow the ghost that varies rapidly with passage of, for example, moving objects.

Also, the normal ghost is detected and canceled on the basis of the signal after the nearby ghost has been canceled thus detection characteristics of the normal ghost varies depending on the conditions of cancellation of the nearby ghost.

SUMMARY OF THE INVENTION

Accordingly, an object of the present invention is to eliminate the above-described difficulty accompanying a proposed ghost canceling apparatus.

A ghost canceling apparatus according to the present invention is provided with a reference waveform Fourier-coefficient holding unit and a normal ghost detection unit of which holds a Fourier-coefficient produced through Fourier transform of a reference waveform; a nearby region Fourier transform unit and a normal region Fourier transform unit for Fourier-transforming the nearby region and the normal region, respectively, of the waveform extracted from a received television signal; an operational unit for dividing the output of the normal region Fourier transform unit by the output of the nearby region Fourier transform unit and then for multiplying thus obtained quotient by a Fourier coefficient which is held in the reference waveform Fourier coefficient holding unit; an reverse Fourier transform unit for reverse Fourier transforming the output of the operational unit; and a tap gain supplying unit for supplying a dummy normal ghost producing unit with the output of the reverse Fourier transform unit as a tap gain of a transversal filter.

DESCRIPTION OF HE PREFERRED EMBODIMENTS

An ideal characteristics $R(jw)$ in the base band is given by:

$$R(jw) = G(jw) \cdot H(jw) \quad (1)$$

where $G(jw)$ is an overall transfer characteristics accounting for the ghosts from a transmitting side to a stage immediately before the ghost canceling apparatus at a receiving side and $H(jw)$ is a transfer characteristics of an ideal ghost canceling apparatus.

From Eq.(1), the transfer characteristics $H(jw)$ of the ideal ghost canceling apparatus is:

$$H(jw) = R(jw)/G(jw) \quad (2)$$

$G(jw)$ can be obtained by Fourier transforming an impulse response, for example, using a pulse signal sin x/x as a reference waveform. Since sin x/x bar signal and vertical composite signal can be treated as a step response, they can be transformed into an impulse response by differentiating them thus resulting in $G(jw)$. The transfer characteristics $G(jw)$ is divided into two regions, $G1(jw)$ for the nearby ghost region and $G2(jw)$ for the normal ghost region. That is:

$$G(jw) = G1(jw) + G2(jw) \quad (3)$$

Using Eq.(3), Eq.(2) is expressed as follows.

$$H(jw) = R(jw)/\{G1(jw) + G2(jw)\} = \quad (4)$$
$$\{R(jw)/G1(jw)\}/\{1 + G2(jw)/G1(jw)\}$$

Thus the transfer characteristics $H(jw)$ of the ideal ghost canceling apparatus is grouped into a transfer function $H1(jw)$ of the nearby ghost cancellation filter and a transfer function $H2(jw)$ of the normal ghost cancellation filter.

$$H1(jw) = [R(jw)/G1(jw)] \quad (5)$$

$$H2(jw) = 1/[1 + G2(jw)/G1(jw)] \quad (6)$$

According to Eq.(5), the transfer function $H1(jw)$ of the nearby ghost cancellation filter is given on the basis of the transfer function $G1(jw)$ of the nearby ghost region and the ideal base band characteristics $R(jw)$. Also, the reverse Fourier transformation of $H1(jw)$ can be used as the coefficient of the nearby ghost canceling filter.

Further, according to Eq.(6), the transfer function $H2(jw)$ of the normal ghost cancellation filter can be obtained from the transfer function $G1(jw)$ of the nearby ghost region and the transfer function $G2(jw)$ of the normal ghost region. Also, the reverse Fourier transform of $-G2(jw)/G1(jw)$ can be used as the coefficient of the normal ghost cancellation filter. In addition to this, the filter may be formed of a cyclic type.

In this manner, only knowing the signal input to the ghost canceling apparatus can find the coefficient of the filter for canceling the nearby and the normal ghost.

The coefficient of the nearby ghost cancellation filter obtained through Eq.(5) generally exhibits an impulse response of an infinite length. The actual filter construction is of a finite length thus the waveform ultimately obtained differs from theory, causing a residual ghost. The residual ghost cannot be a practical problem if the nearby ghost cancellation filter has a sufficiently wide bandwidth compared to the nearby region to which ghost cancellation is applied. If the length of the nearby ghost cancellation filter is shorter, then the residual ghost will be a problem, which can be overcome as follows.

That is, the transfer function $C(jw)$ of the ideal nearby ghost cancellation filter is:

$$C(jw) = R(jw)/G1(jw) \quad (7)$$

However, the transfer characteristics $C1(jw)$ of the nearby ghost cancellation filter actually used is:

$$C1(jw) = C(jw) - E(jw) \quad (8)$$

$C1(jw)$ has an error component $E(3w)$ with respect to the ideal value $C(jw)$.

Thus, with respect to the overall transfer characteristics $G(jw)$ that contains the ghost, the transfer characteristics after the nearby ghost has been eliminated is given by:

$$G(jw) \cdot C1(jw) = \{G1(jw) + G2(jw)\} \cdot \{C(jw) - E(jw)\} = \quad (9)$$

$$R(jw) + G2(jw) \cdot C(jw) - \{G1(jw) + G2(jw)\} \cdot E(jw)$$

Since the ultimate transfer characteristics after the normal ghost cancellation only needs be R(jw), the following relation can be obtained:

$$G(jw) \cdot C1(jw) \cdot C2(jw) = R(jw) \quad (10)$$

where C2(jw) is the transfer characteristics of the normal ghost cancellation filter.

From Eq.(9) and (10), the transfer characteristics C2(jw) of the normal ghost filter is given by:

$$C2(jw) = R(jw)/\{G(jw) \cdot C1(jw)\} = R(jw)/\{R(jw) + \quad (11)$$

$$G2(jw) \cdot C(jw) - [G1(jw) + G2(jw)] \cdot E(jw)\} =$$

$$\{1 + G2(jw)/G1(jw) - E(jw) \cdot [G1(jw) + G2(jw)]/R(jw)\}^{-1}$$

From Eq.(11), the coefficient of the normal ghost cancellation filter of a cyclic type is given by reverse Fourier transforming $$G2(jw)/G1(jw) - E(jw) \cdot \{G1(jw) + G2(jw)\}/R(jw) \quad (12)$$

Figure 3:
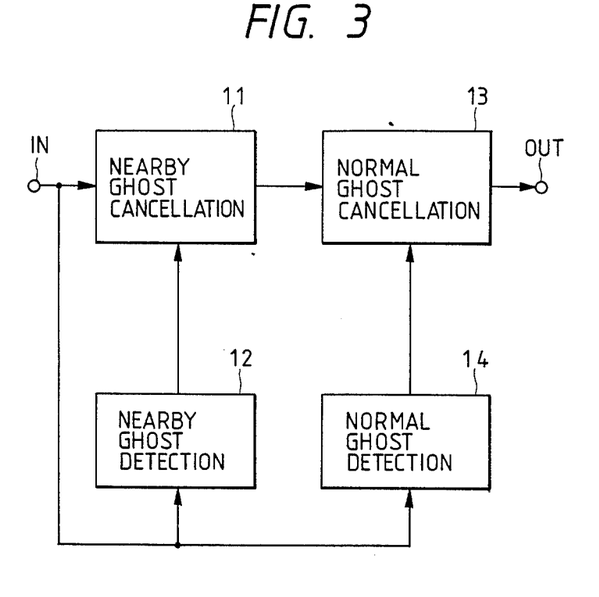
FIG. 3 is a block diagram for showing an arrangement of a ghost canceling apparatus of a first embodiment according to the invention.

FIG. 3 is a block diagram for illustrating an arrangement of a ghost canceling apparatus according to a first embodiment of the present invention, in which reference numeral 11 is a nearby ghost cancellation unit, 12 a nearby ghost detection unit, 13 a normal ghost cancellation unit, and 14 a normal ghost detection unit.

To an input terminal IN is supplied a received television signal from which the ghost is to be canceled.

The nearby ghost detection unit 12 detects the nearby ghost on the basis of a reference waveform contained in the received television signal arriving at the input terminal IN; produces a tap gain for producing an optimum dummy nearby ghost; and supplies the nearby ghost cancellation unit 11 with the tap gain.

At the same time as detection of the nearby ghost by the aforementioned nearby ghost detection unit 12, the normal ghost detection unit 14 detects the normal ghost on the basis of a reference waveform contained in the received television signal arriving at the input terminal IN; produces a tap gain for producing an optimum dummy normal ghost; and then supplies the normal ghost cancellation unit 13 with the tap gain.

Figure 4:
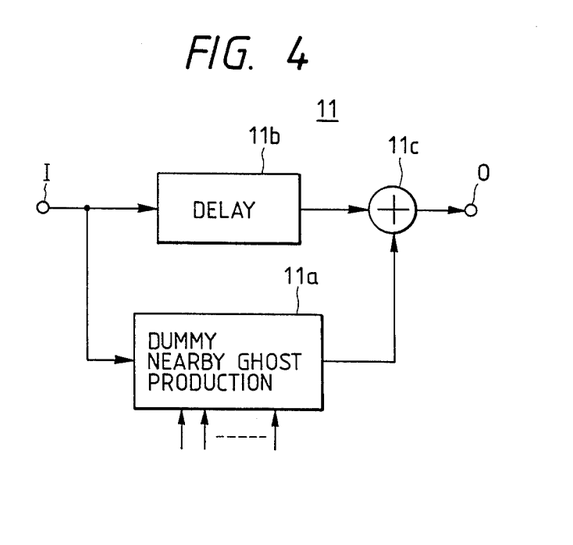
FIG. 4 is a block diagram for showing an arrangement of a nearby ghost cancellation unit of FIG. 3.

The nearby ghost cancellation unit 11, as shown in FIG. 4, is of a non-cyclic type construction arranged by a delay circuit 11b, an adder circuit 11c, and a dummy nearby ghost producing circuit 11a formed of a transversal filter. The dummy nearby ghost producing circuit 11a produces the dummy nearby ghost in accordance with the tap gain supplied from the nearby ghost detection unit 12, and supplies one of the input terminals of the adder circuit 11c with the dummy nearby ghost. The adder circuit 11c adds the dummy nearby ghost supplied through one of input terminal thereof and the originally received television signal through the other input terminal via a delay circuit 11b so as to cancel the nearby ghost in the received television signal and then to supply the television signal after the nearby ghost has been canceled to the output terminal OUT.

Figure 5:
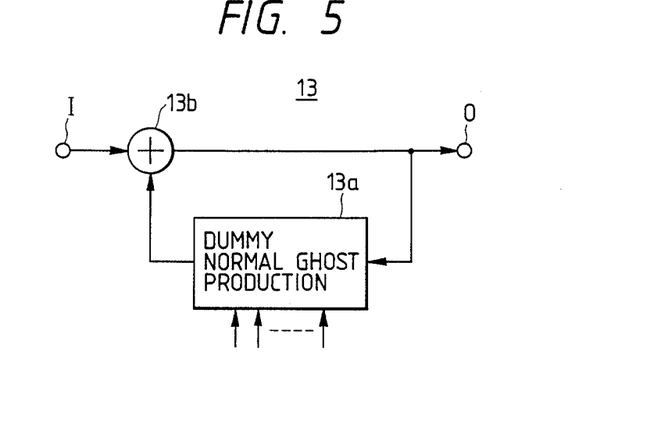
FIG. 5 is a block diagram for illustrating the arrangement of the normal ghost cancellation unit of FIG. 3.

As shown in FIG. 5, the normal ghost cancellation unit 13 is of a cyclic construction in which a dummy normal ghost producing circuit 13a formed of a transversal filter and an adder circuit 13b are provided. The dummy ghost producing circuit 13a produces the dummy normal ghost in accordance with the tap gain supplied from the normal ghost detection unit 14, and provides one of the input terminals of the adder circuit 13b with the dummy normal ghost. The adder circuit 13b adds the dummy normal ghost supplied through one of the input terminals and the originally received television signal supplied to the input terminal I from the preceding nearby ghost cancellation unit 11 so as to cancel the normal ghost in the received television signal and then to output to an output terminal 0.

Figure 6:
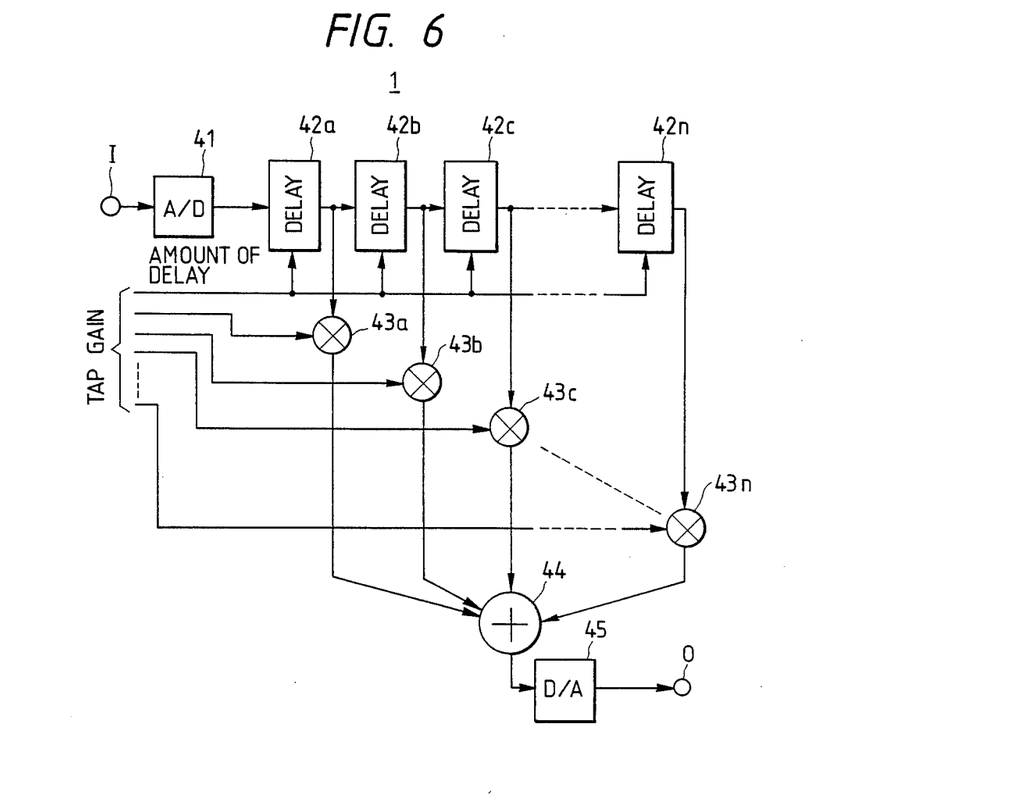
FIG. 6 is a block diagram for showing exemplary embodiments of a dummy nearby ghost producing circuit in FIG. 4 and a dummy normal ghost producing circuit in FIG. 5.

As shown in FIG. 6, the transversal filter 1, constituting the dummy nearby ghost producing circuit 11a and the dummy normal ghost producing circuit 13a, is formed of a plurality of cascaded delay circuits 42a, 42b, 42c, ... 42n, multipliers 43a, 43b, 43c, 43n, for multiplying the respective outputs of these delay circuits by the tap gain, and a transversal filter portion including an adder 44 which adds the respective outputs of these multipliers. The transversal filter 1 produces the dummy nearby ghost and the dummy normal ghost in accordance with the tap gains supplied from the nearby ghost detection unit 12 and the normal ghost detection unit 14.

Figure 7:
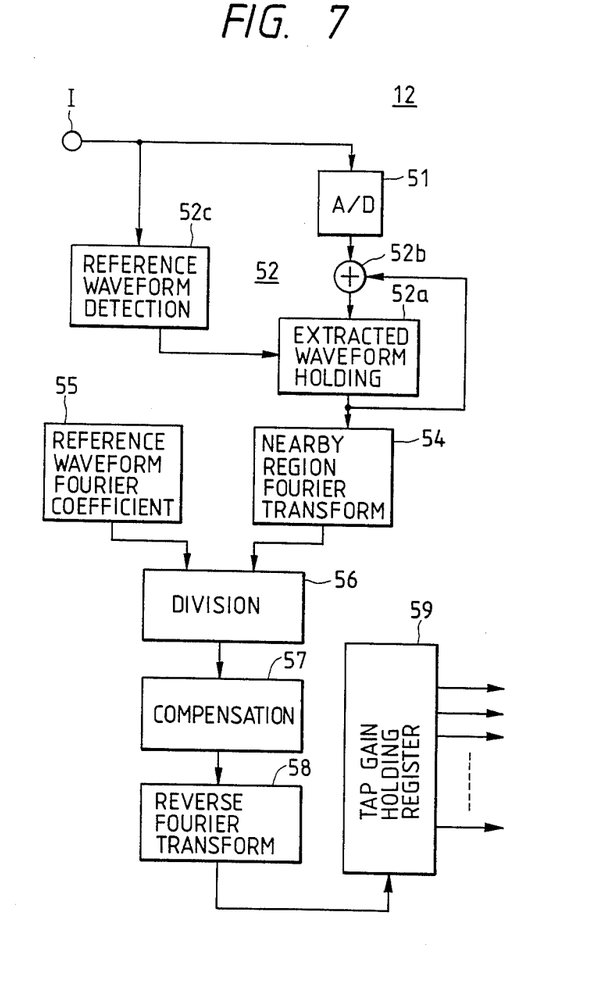
FIG. 7 is a block diagram for illustrating an arrangement of a nearby ghost cancellation detection unit in FIG. 3.

As shown in FIG. 7, the nearby ghost detection unit 12 in FIG. 3 is provided with an A/D converter 51, a reference waveform extract unit 52, a Fourier transformer 54, a reference waveform Fourier coefficient holding unit 55, a division unit 56, a correction unit 57, an reverse Fourier transformer 58, and a tap gain holding register 59. The reference waveform extract unit 52 is formed of an extracted waveform holding circuit 52a, an adder unit 52b and a reference waveform detection unit 52c.

Figure 8A:
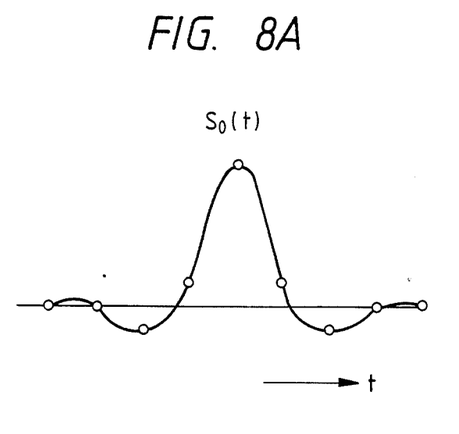
FIGS. 8A and 8B and FIGS. 9A and 9B are diagrams for showing concept of operation of the circuits in FIG. 7.

At transmission side of the television signal, a reference waveform $S_0(t)$ for detecting the ghost as shown in FIG. 8A is inserted into a predetermined position such as a vertical blanking section. The reference waveform $S_0(t)$ is obtained by limiting the bandwidth of an impulse waveform through a low pass filter circuit of an amplitude-frequency characteristics shown in FIG. 8B.

In the mean time, discrete Fourier coefficient group R(jw) produced through Fourier transform of the reference waveform $S_0(t)$ shown in FIG. 8A is held in advance in the reference waveform Fourier series holding unit 55 within the nearby ghost detection unit 12.

Figure 8B:
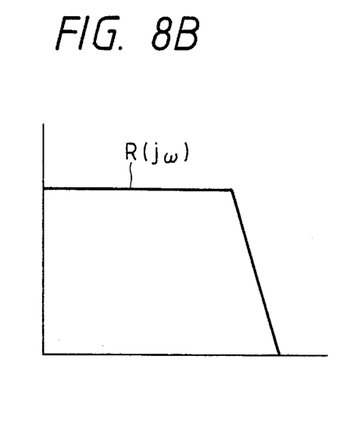

This Fourier coefficient R(jw) is nothing but representation of the amplitude-frequency characteristics of the low pass filter shown in FIG. 8B in terms of a group of discrete extracted values.

Figure 9A:
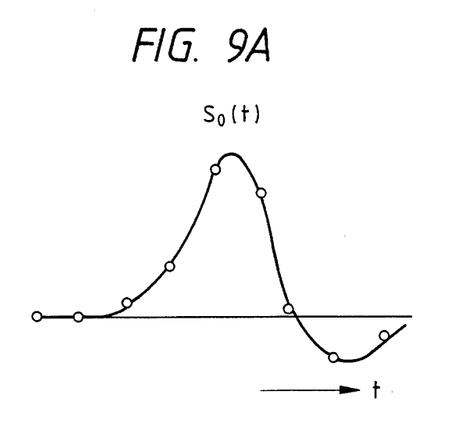
Figure 9B:
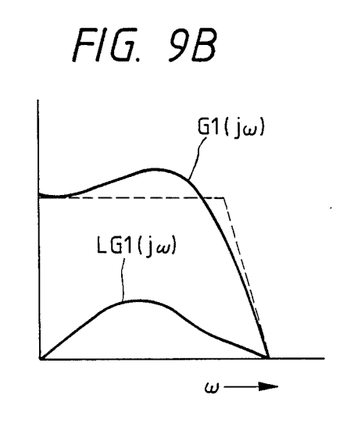

The actual reference waveform S(t) contained in the received television signal passes through the input terminal I and the A/D converter 51 in FIG. 7; is removed from the predetermined position in the television signal under timing control of the reference waveform detection unit 52c; and is then written into the extractd waveform holding unit 52a. In order to reduce noise within the extracted reference waveform time averaging is effected over a plurality of extracting times by connecting between the input/output terminals of the extracted waveform holding unit 52a through the adder unit 52b. The reference waveform S(t), received and extracted, is affected by the transmission characteristics that allow the ghost to pass, thereby being distorted as shown in FIG. 9A compared to the waveform inserted at the transmission side.

The received reference waveform S(t) is read out from the extracted waveform holding unit 52a and is Fourier transformed over the nearby region in the vicinity of changing point of the reference waveform by the Fourier transform unit 54, thereby being transformed into discrete Fourier-transform coefficient group G1(jw). In the figure |G1|(jw) represents the amplitude and LG1(jw) indicated the amount of phase shift.

The division unit 56 divides the reference waveform Fourier coefficient R(jw) that is read from the reference waveform Fourier coefficient holding unit 55 by the Fourier coefficient G1(jw) having corresponding frequency components received from the Fourier transform unit 54 so as to produce the transfer characteristics H1(jw) of the nearby ghost cancellation Fourier transform given by $$H1(jw) = R(jw)/G1(jw) \quad (13)$$

Thus reverse Fourier transforming the division result of the division unit 56 to use as the tap gain for the transversal filter in the nearby ghost cancellation unit 11 can produce the dummy nearby ghost.

The correction unit 57 performs a variety of corrections such as aligning frequency response of the division result outputted from the division unit 56 and lifting an abrupt drop at a particular frequency of the result of division to a level of division results in the vicinity by regarding that the abrupt drop is due to beet interference.

Figure 10:
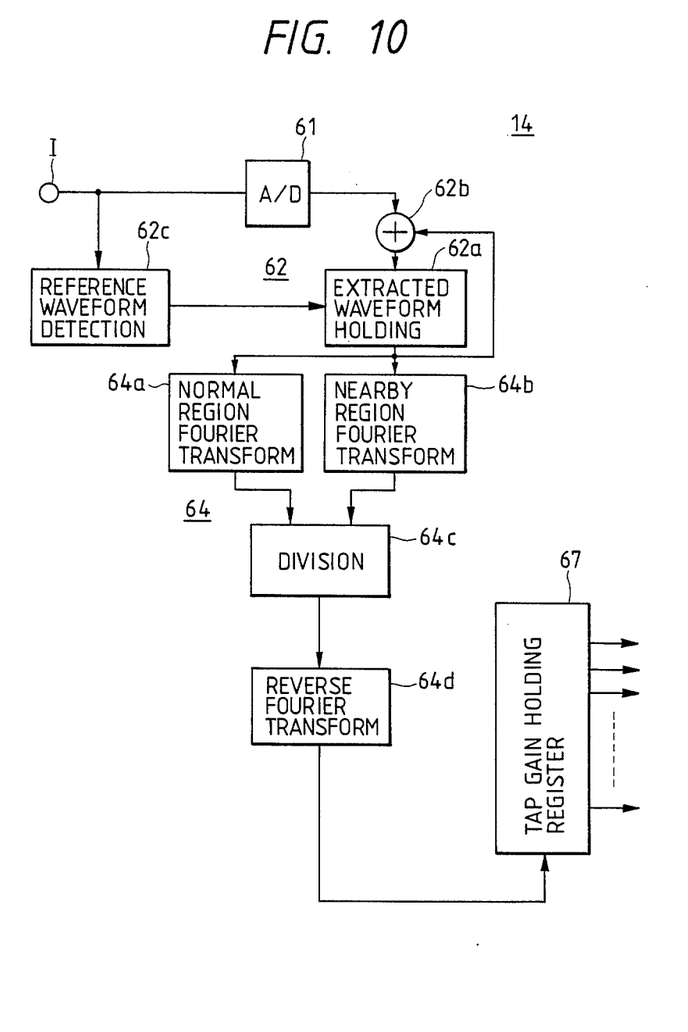
FIG. 10 is a diagram for illustrating the arrangement of the normal ghost detection unit in FIG. 3.

As shown in FIG. 10, the normal ghost detection unit 14 in FIG. 3 is provided with an A/D converter 61, a reference extracting unit 62, a reference waveform correction unit 64 and a tap gain holding register 67. The reference waveform extracting unit 62 is formed of a extracted waveform holding unit 62a, an adder 62b and a reference waveform detection unit 62.

The received television signal appearing at the input terminal IN in FIG. 3, from which the ghost is to be canceled, is supplied to the input terminal I of the normal ghost detection unit 14, in FIG. 10.

The reference waveform contained in this received television signal is converted into a digital signal by the A/D converter 61; is removed from the predetermined position of the television signal under timing control of the reference waveform detection unit 62c; and is then written into the extracted waveform holding unit 62a. In order to reduce noise in the extracted reference waveform, time averaging is effected over a plurality of extracting times by connecting between the input/output terminals of the extracted waveform holding unit 62a through the adder unit 62b.

The actual reference waveform S(t) distorted by the ghost is extracted from the received television signal and is held by the extracted waveform holding unit 62a. In the case where no nearby ghost appears in the received television signal, the normal ghost components in the normal region of the extracted reference waveform S(t) can be treated as an impulse response, in which case the tap gain that is to be supplied to the transversal filter of the normal ghost cancellation unit 13 can be immediately produced. However, the television signal coming into the normal ghost detection unit 14 directly from the input terminal IN in FIG. 3 has not canceled yet the nearby ghost thereof; therefore precision in detecting the normal ghost becomes poor. To correct the poor precision in detecting the normal ghost, a reference waveform correction unit 64 is provided for correcting with respect to the reference waveform on the side of the extracted waveform holding unit 62a.

The reference waveform correction unit 64 is formed of a normal region Fourier transform unit 64a, a nearby region Fourier transform unit 64b, a a division unit 64c, and an reverse Fourier transform unit 64d.

The reference waveform that is read from the extracted waveform holding unit 62a is transformed into the Fourier coefficient G2(jw) by the normal region Fourier transform unit 64a for Fourier transforming the normal region following the changing point of the reference waveform and is then supplied to one of the input terminals of the division unit 64c. At the same time, the reference waveform that is read from the extracted waveform holding unit 62a is transformed into the Fourier coefficient G1(jw) by the nearby region Fourier transform unit 64b which Fourier transforms the nearby region in the vicinity of the changing point of the reference waveform; is then supplied to the other input terminal of the division unit 64c.

The division unit 64c divides the Fourier coefficient G2(jw) of the normal region by the Fourier coefficient G1(jw) in the nearby region and causes the polarity to be reversed, thus producing transfer characteristics of the normal ghost cancellation filter.

$$-G2(jw)/G1(jw) \quad (14)$$

Thus the dummy normal ghost can be produced by reverse Fourier transform in the result of division of the division unit 64 through the reverse Fourier transform unit 64d to thereby use this Fourier transformed result as a tap gain for the transversal filter in the normal ghost cancellation unit 13.

The reference waveform extracting unit 62 the A/D converter 61, and the nearby region Fourier transform unit 64 in the normal ghost detection unit 14 shown in FIG. 10 may be omitted and instead the outputs from the reference waveform extracting unit 52, the A/D converter 51d, and the nearby region Fourier transform unit 54 shown in FIG. 7 may be used.

Figure 11:
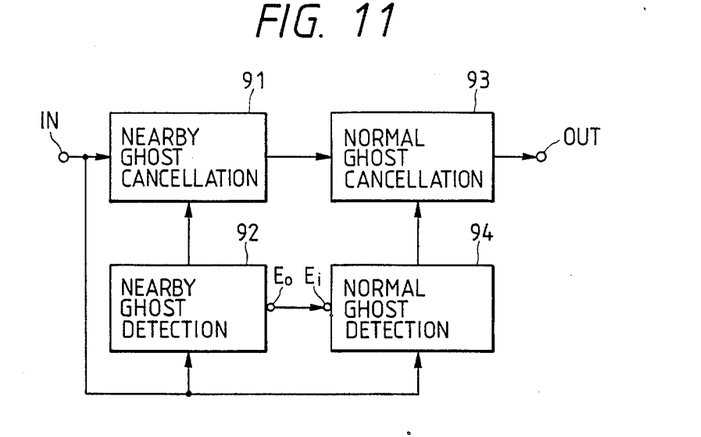
FIG. 11 is a block diagram for showing an arrangement of a ghost canceling apparatus of a second embodiment according to the present invention.

FIG. 11 is a block diagram for showing a second embodiment of a ghost canceling apparatus according to the present invention, in which reference numeral 91 is a nearby ghost cancellation unit, 92 a nearby ghost detection unit, 93 a normal ghost cancellation unit, and 94 a normal ghost detection unit.

The nearby ghost cancellation unit 91 and the normal ghost cancellation unit 93 are of the same construction and functions as those of the nearby ghost cancellation unit 11 and the normal ghost cancellation unit 13 in FIG. 3. Thus duplicate description is omitted.

To the input terminal IN is supplied the received television signal from which the ghost is to be canceled. The nearby ghost detection unit 92 detects the nearby ghost on the basis of the reference waveform contained in the received television signal appearing at the input terminal IN; and produces a tap gain error corresponding to the difference between the optimum tap gain and a tap gain closest to the optimum tap gain on the basis of the optimum tap gain for producing an optimum dummy nearby ghost and the tap gain closest to the optimum tap gain in accordance with the length of the transversal filter of the nearby ghost cancellation unit 91. The nearby ghost detection unit 92 supplies the nearby ghost cancellation unit 91 with the tap gain in accordance with the length of the above-mentioned transversal filter, while also providing the normal ghost detection unit 94 with the aforementioned tap gain error.

Concurrently with the detection of the nearby ghost by the aforementioned nearby ghost detection unit 92, the normal ghost detection unit 94 detects the normal ghost on the basis of the reference waveform contained in the received television signal appearing at the input terminal IN and the tap gain error of the nearby ghost cancellation filter supplied from the nearby ghost detection unit 92; produces the tap gain for producing the optimum dummy normal ghost; and then supplies the normal ghost cancellation unit 93 with this tap gain.

Figure 12:
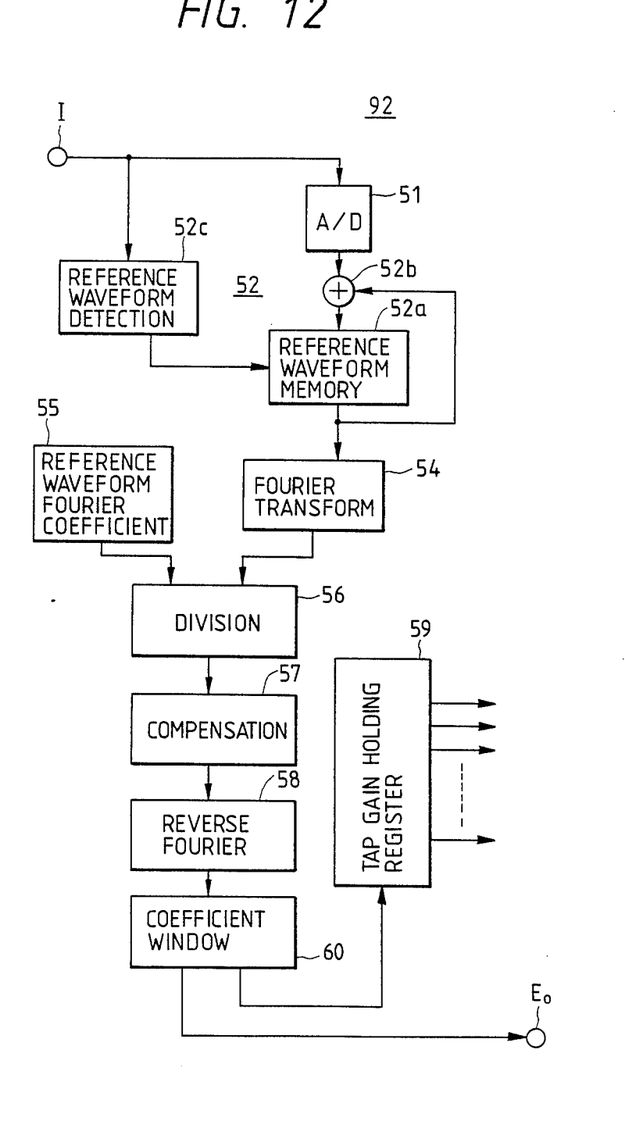
FIG. 12 is a block diagram for illustrating the nearby ghost detection unit in FIG. 11.

As shown in FIG. 12, the nearby ghost detection unit 92 is of the same construction as the nearby ghost detection unit 12 (refer to FIG. 7) described earlier except that it is added a coefficient window 60. With the nearby ghost detection unit 92 in FIG. 12, the remaining structural elements given the same reference numerals as in FIG. 7 are the same elements as those which have been described with respect to the nearby ghost detection unit 12 in FIG. 7. Thus duplicated description is omitted.

Figure 13A:
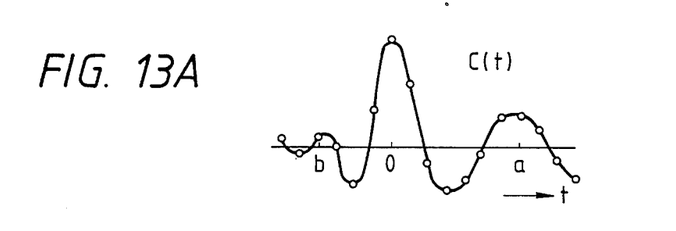
FIGS. 13A-13D are diagrams for illustrating concept of operation of the apparatus in FIG. 11.
Figure 13B:
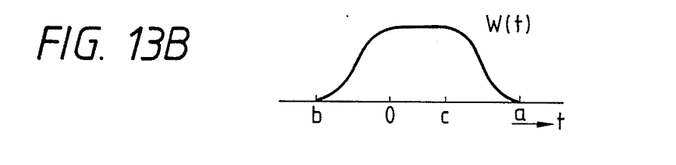
Figure 13C:
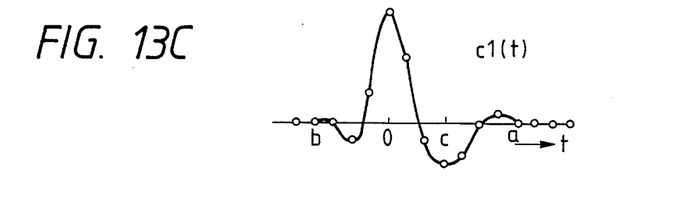
Figure 13D:
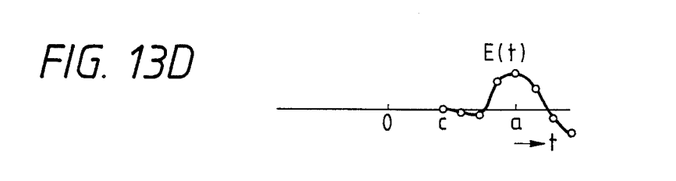

The reverse Fourier transform output C(t) of the transfer characteristics of the nearby ghost cancellation filter produced by the reverse Fourier-transform unit 58 is, in general, of an impulse response as shown in FIG. 13A. In the mean time, the number of taps of the transversal filter in the nearby ghost cancellation unit 91 is finite as shown by $-b \leq t \leq a$ in FIG. 13A. Thus the tap gain may appear beyond this range, in which case if the transversal filter tap of the normal ghost cancellation unit 93 is within a range of $c \leq t$, then the coefficient window 60 multiplies the ideal nearby ghost cancellation filter coefficient C(t) produced by the reverse Fourier transform unit 58 by a window function W(t) as shown in FIG. 13B, thereby supplying the tap gain holding register 59 with the coefficient Cl(t) matched with the number of the taps of the transversal filter of the nearby ghost cancellation unit 91. Further, the coefficient window 60 calculates the error E(t) of C(t) approximated by the window function W(t) excluding the previous ghost and provides this error E(t) to an output $E_0$ associated with the normal ghost detection unit 94.

Figure 14:
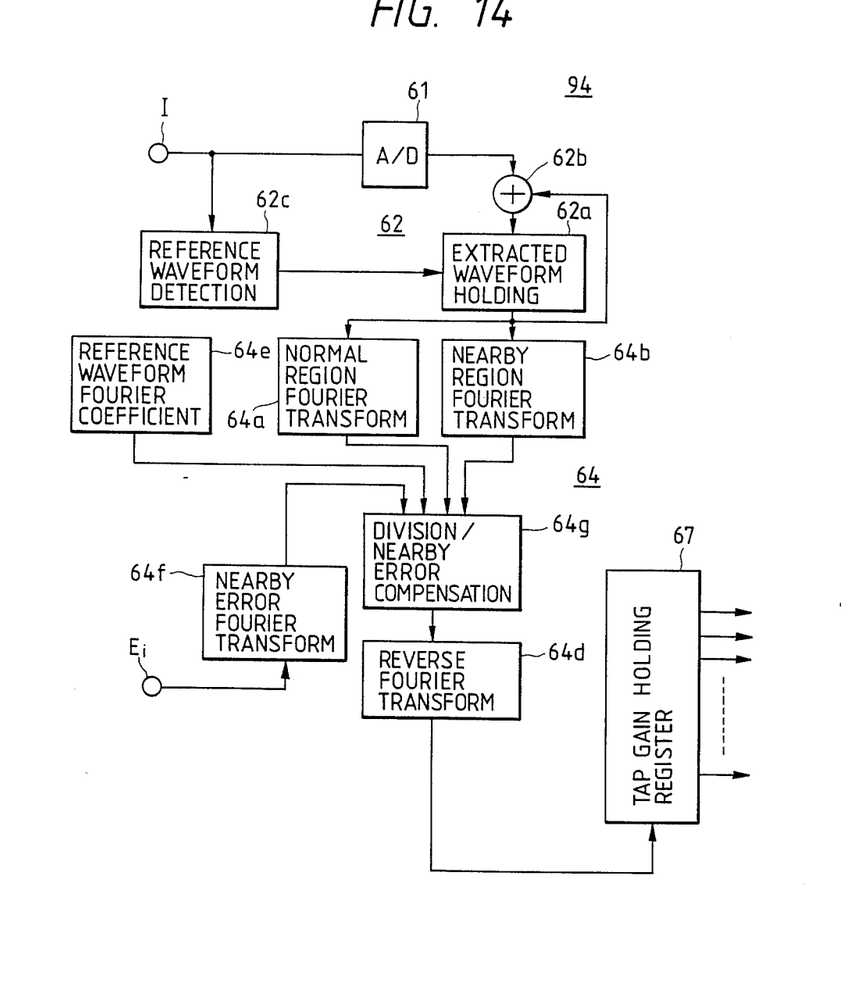
FIG. 14 is a block diagram for showing an arrangement of the normal ghost detection unit in FIG. 11.

As shown in FIG. 14, the normal ghost detection unit 94 is of the same construction as the normal ghost detection unit 14 (refer to FIG. 10) of the embodiment described earlier except that only the reference waveform correction unit 64 is modified. With the normal ghost detection unit 94 in FIG. 14, structural elements having the same reference numerals as in FIG. 10 are same as those elements described with respect to the normal ghost detection unit 94 in FIG. 10. Thus the description thereof is omitted.

The reference waveform correction unit 64 is formed of a normal region Fourier transform unit 64a, a nearby region Fourier transform unit 64b, a reference waveform Fourier coefficient holding unit 64e, a nearby error Fourier transform unit 64f, a division/nearby error compensation unit 64g and an reverse Fourier transform unit 64d. In the reference waveform Fourier coefficient holding unit 64e is retained in advance discrete Fourier coefficient group R(jw) produced by Fourier transforming the reference waveform $S_0(t)$ shown in FIG. 8A.

The reference waveform that is read from the extracted waveform holding unit 62a is Fourier transformed into the Fourier coefficient G2(jw) by the normal region Fourier transform unit 64a that Fourier transforms with respect to the normal region beyond the changing point, and is then fed to one of the input terminals of a division/nearby error compensation unit 64g. At the same time, the reference waveform that is read from the extracted waveform holding unit 62a is transformed into the Fourier coefficient Gl(jw) by the nearby region Fourier transform unit 64b which Fourier transforms with respect to the nearby region in the vicinity of that changing point, and is fed to one of the input terminals of the division/nearby error compensation unit 64g.

The error E(t) of the tap gain of the nearby ghost cancellation filter supplied from the input terminal Ei is transformed into the nearby error Fourier coefficient by the nearby error Fourier transform unit 64f and is fed to one of the input terminals of the division/nearby error compensation unit 64g. The reference waveform Fourier coefficient R(jw) which is outputted from the reference waveform Fourier coefficient holding unit 64e, is supplied to the remaining input terminal of the division/nearby error compensation unit 64g.

The division/nearby error compensation unit 64g performs the calculation of the aforementioned Eq.(12) on the basis of the Fourier coefficient G2(jw) of the normal region, the Fourier coefficient Gl(jw) of the nearby region, the nearby error Fourier coefficient E(jw) and the reference waveform Fourier coefficient R(jw) supplied to the respective input terminals from the above-mentioned units so as to produce transfer characteristics of the normal ghost cancellation filter for canceling normal ghost including the residual ghost components after cancellation of the nearby ghost.

The output from the division/nearby error compensation unit 64g is reverse Fourier transformed by the reverse Fourier transform unit 64d and is fed from a tap gain holding register 67 to a transversal filter in a normal ghost division unit 93. Thereby, the dummy normal ghost including the remaining components after cancellation of the nearby ghost is produced by the transversal filter in the normal ghost cancellation unit 93.

The present invention is not limited to the embodiments thus far described. It is desirable in practice to improve the ghost canceling apparatus previously described in such a way that oscillation due to the nature of being cyclic type will not occur, thereby preventing degradation of picture quality resulted from the oscillation. A ghost canceling apparatus according to a third embodiment of the present invention is of a construction similar to that shown in FIG. 5 where a normal ghost detection unit, a dummy ghost production unit, and an adder unit are connected in cyclic type.

Figure 15:
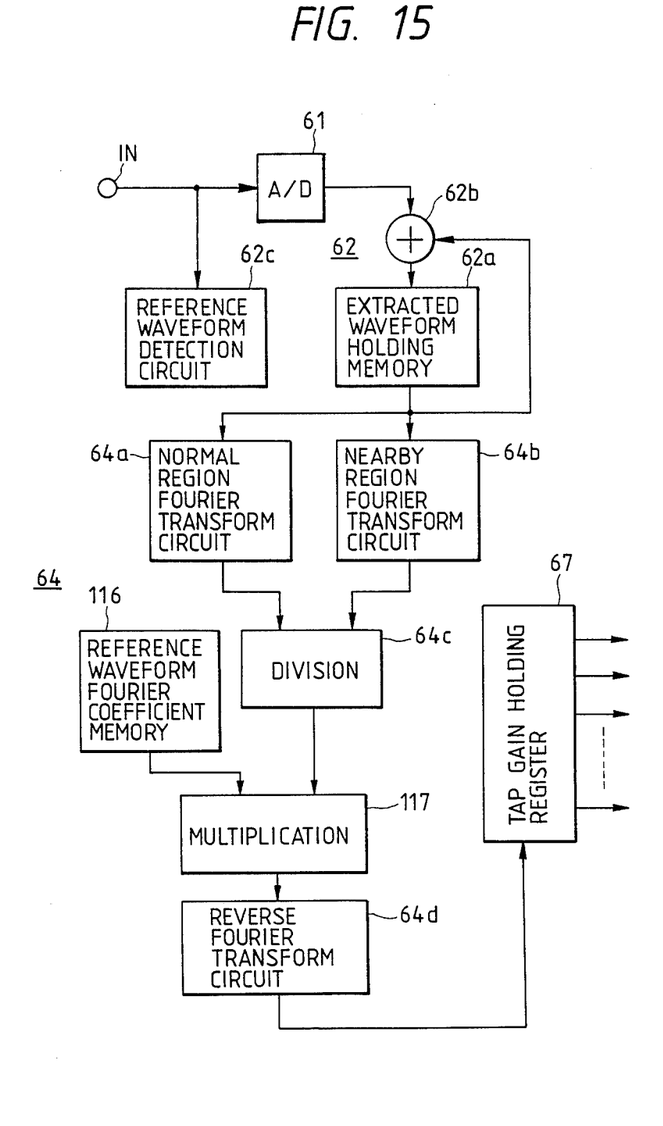
FIG. 15 is a block diagram for showing an arrangement of a normal ghost detection unit constituting a ghost canceling apparatus of a third embodiment according to the present invention.

As shown in FIG. 15, the normal ghost detection unit of a ghost canceling apparatus of cyclic type is formed of the reference waveform detection unit 62c, the A/D converter unit 61, the extracted reference waveform holding unit 62a, the nearby region Fourier transform unit 64b, the normal Fourier transform unit 64a, the division unit 64c, a normal region Fourier transform unit 64d, and the tap gain holding unit 67.

Within the reference waveform Fourier coefficient memory 116 of the normal ghost detection unit is held in advance a reference waveform obtained by Fourier transforming a pulse-like reference waveform of no distortion which has been inserted at a predetermined position in the vertical return period of the transmitted television signal.

Figure 16A:
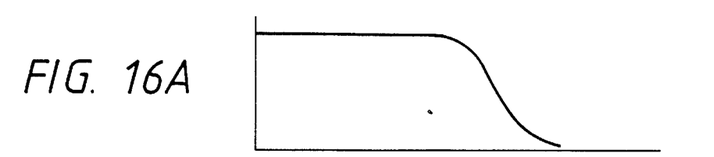
FIGS. 16A-16F are diagrams that show waveforms and characteristics for illustrating functions of the normal ghost detection unit in FIG. 15
Figure 16B:
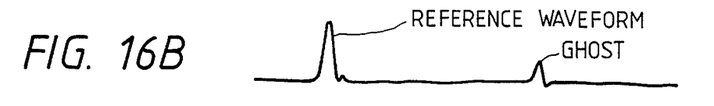

At a predetermined position during the vertical return period of the received television signal appearing at the input terminal IN is contained a pulse-like reference waveform and ghost thereof (normal ghost) that have been inserted at the transmission side as shown in FIG. 16B.

The nearby region of the signal stored in the extracted waveform holding memory is Fourier transformed into a Fourier coefficient as shown by the nearby region Fourier transform unit 64b and is fed to the division unit 64c. Concurrently, the normal region of the signal held in the extracted waveform holding memory 62a is Fourier transformed into a Fourier coefficient as shown in FIG. 16D by the normal region Fourier transform unit 64a and is supplied to the division unit 64c. The division unit 64c divides the Fourier series in the normal region by the Fourier series in the nearby region to thereby provide a Fourier series ratio as shown in FIG. 16E.

Figure 16C:
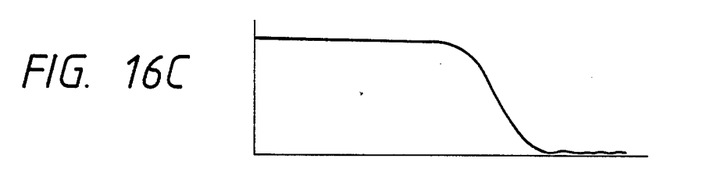
Figure 16D:
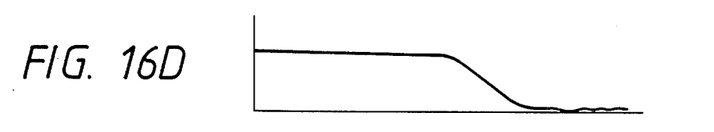
Figure 16E:
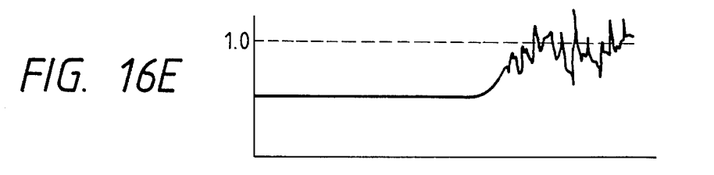
Figure 16F:
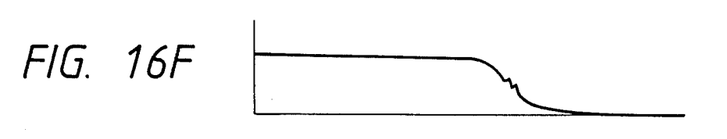

As shown in FIG. 16C and FIG. 16D, both the signal in the nearby region and the signal in the normal region do not contain much of high frequency component in the Fourier transform coefficient but have much of noise component. Therefore, the high frequency component in the ratio of one to the other varies irregularly with noise as shown in FIG. 16E, while also exhibiting a portion greater than 1. The output of the division unit 64c is not directly reverse Fourier transformed but is multiplied the reference waveform Fourier coefficient shown in FIG. 16A by the multiplier 117. Through this multiplication, the high frequency component having irregular portions greater than 1 contained in the Fourier coefficient ratio can be eliminated as shown in FIG. 16F. The output of the multiplier is reverse Fourier transformed by the reverse Fourier transform unit 64d and is then held in the tap gain holding unit 67 as a tap gain for the transversal filter constituting the normal dummy ghost production unit.

In this manner, the high frequency component having irregular portions greater than 1 contained in the Fourier coefficient ratio is eliminated through multiplication by the reference waveform Fourier coefficient, thus effectively preventing possibility of oscillation of the normal ghost canceling apparatus of a cyclic type.

Although the embodiments have been described by way of example as an impulse as a reference bandwidth of which is limited, other suitable waveform, such as one in which a step waveform is differentiated to limit bandwidth thereof, may also be used.

The aforementioned nearby ghost detection/ cancellation unit and normal ghost detection/cancellation unit may be implemented either by hardware or software or intermixing the both.

As described above in detail, a ghost canceling apparatus according to the present invention is arranged in such a way that non-distorted Fourier coefficient of a reference waveform is stored in advance; this Fourier coefficient is multiplied the ratio of the Fourier coefficient of the nearby region to that of the normal region of the extracted reference waveform; and is then reverse transformed to produce tap gains. Thus cancellation of the portions having irregular and greater than 1 in the high frequency region of the Fourier coefficient ratio is assured, thus preventing degradation of the picture quality due to oscillation involved in cyclic type.

As described above in detail, the ghost canceling apparatus according to the present invention is arranged in such a way that detection of the normal ghost is initiated at the same time as the detection of the nearby ghost. Thus required time for ghost-cancellation process is shortened to about a half of that conventionally required, thereby greatly improving tracking ability to follow a high speed ghost due to moving objects. Further, the ghost canceling apparatus according to the present invention is arranged in such a way that detection of the normal ghost uses the signal before the nearby ghost is canceled. Thus the process of canceling the nearby ghost will not affect cancellation of the normal ghost, thus permitting stable normal ghost cancellation.

What is claimed is:

1. A ghost canceling apparatus for a television signal comprising:

an input terminal for receiving a television signal;

nearby ghost canceling means having a transversal filter for producing a dummy nearby ghost component by passing the received television signal through said transversal filter, said nearby ghost canceling means producing a first composite television signal of said dummy nearby ghost component with the received original television signal;

means for detecting a nearby ghost in accordance with a predetermined reference waveform contained in the received television signal, said nearby ghost detecting means supplying a tap gain to said transversal filter of said nearby ghost canceling means;

normal ghost canceling means having a transversal filter for producing a dummy normal ghost component by passing said first composite television signal generated by said nearby ghost canceling means through said transversal filter, said normal ghost canceling means producing a second composite television signal of said normal ghost component with said first composite television signal; and means for detecting a normal ghost in accordance with a predetermined reference waveform contained in the received television signal, said normal ghost detecting means supplying a tap gain to said transversal filter of said normal ghost canceling means.

2. The ghost canceling apparatus of claim 1, further comprising:

means for extracting a reference waveform from the received television signal, said reference waveform extracting means converting the analogue television signal to digital form;

means for Fourier transforming said extracted reference waveform to produce an extracted reference waveform Fourier coefficient output;

means for holding in a memory a Fourier coefficient transformed from a non-distorted reference waveform to be inserted into a television signal before transmission thereof and for reading and for outputing a non-distorted reference waveform Fourier coefficient which is Fourier transformed; and means for dividing said non-distorted reference waveform Fourier coefficient outputted by said Fourier coefficient holding and outputing means by an output of said extracted reference waveform Fourier transforming means, said dividing means reverse Fourier transforming said divided reference waveform, said dividing means supplying said reverse Fourier transformed reference waveform, as a tap gain, to said transversal filter of said nearby ghost canceling means.

3. The ghost canceling apparatus of claim 1, further comprising:
means for extracting a reference waveform from the received television signal, said reference waveform extracting means converting the analogue television signal to digital form;
means for individually Fourier transforming a nearby region and normal region of said extracted reference waveform and for dividing a Fourier coefficient of said normal region by a Fourier coefficient of said nearby region, said Fourier transforming means supplying the result of the division as a tap gain to said transversal filter of said normal ghost canceling means.

4. The ghost canceling apparatus of claims 2 or 3, wherein said reference waveform extracting means extracts said reference waveform while averaging over a plurality of times of appearance of said reference waveform contained in said received television signal at said input terminal.

5. The ghost canceling apparatus of claim 1, wherein said normal ghost canceling means is provided with a cyclic composition means for composing the received television signal outputted from said nearby ghost canceling means with said dummy normal ghost produced from said received television signal.

6. The ghost canceling apparatus of claim 1, wherein said reference waveform is a waveform in which an impulse waveform is bandwidth limited.

7. The ghost canceling apparatus of claim 1, wherein said reference waveform is a waveform obtained by differentiating a step waveform to limit bandwidth thereof.

8. A ghost canceling apparatus for a television signal, comprising:
means for detecting a normal ghost contained in the television signal;
a transversal filter for producing a dummy normal ghost; and
means for adding said dummy normal ghost to the received television signal,
wherein said normal ghost detecting means comprises:
means for holding a Fourier coefficient produced by Fourier transforming a reference waveform inserted into a predetermined position of a transmitted television signal;
means for Fourier transforming a nearby region of a reference waveform extracted from said received television signal;
means for Fourier transforming a normal region spaced away from said reference waveform extracted from said received television signal;
means for dividing an output of said normal region Fourier transforming means by an output of said nearby region Fourier transforming means, said dividing means multiplying a Fourier coefficient of said reference waveform Fourier coefficient holding means;
means for reverse Fourier transforming the output of said dividing and multiplying means; and
means for supplying the output of said reverse Fourier transforming means, as a tap gain, to said transverse filter.

9. The ghost canceling apparatus of claim 2 wherein: said holding and outputting means stores in a memory of a Fourier coefficient transformed from a non-distorted reference waveform to be inserted into a television signal before transmission thereof and for reading and for outputting said Fourier coefficient from said memory.

10. The ghost canceling apparatus of claim 2 wherein the means for holding and outputting stores in a memory a Fourier coefficient transformed from a non-distorted reference waveform to be inserted into a television signal before transmission thereof and for reading and for outputting a Fourier coefficient which is Fourier transformed.

* * * * *